June 24, 1941.   A. M. BRAATEN   2,247,218
NEUTRALIZING CIRCUITS EMPLOYING RESONANT LINES
Filed April 28, 1938   2 Sheets-Sheet 1

INVENTOR.
ARTHUR M. BRAATEN
BY
ATTORNEY.

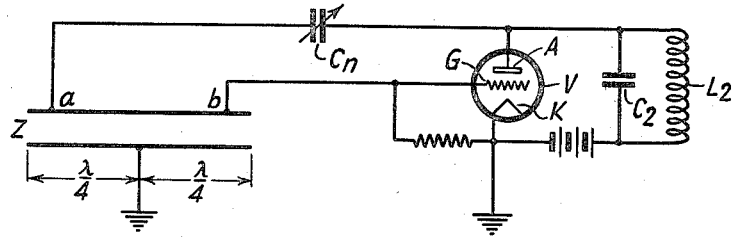
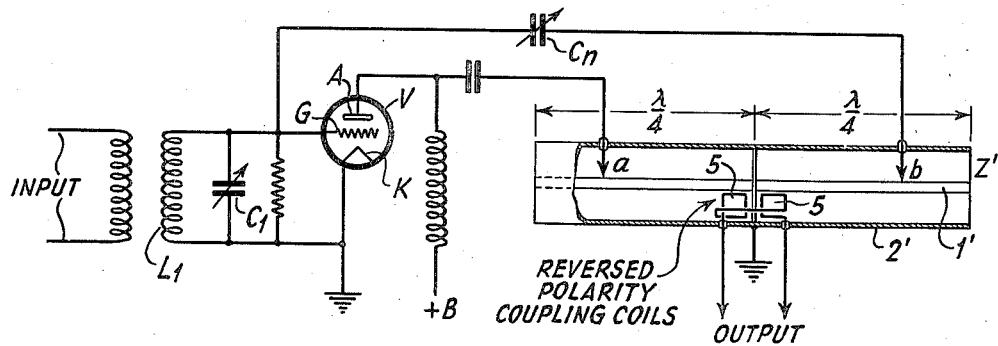
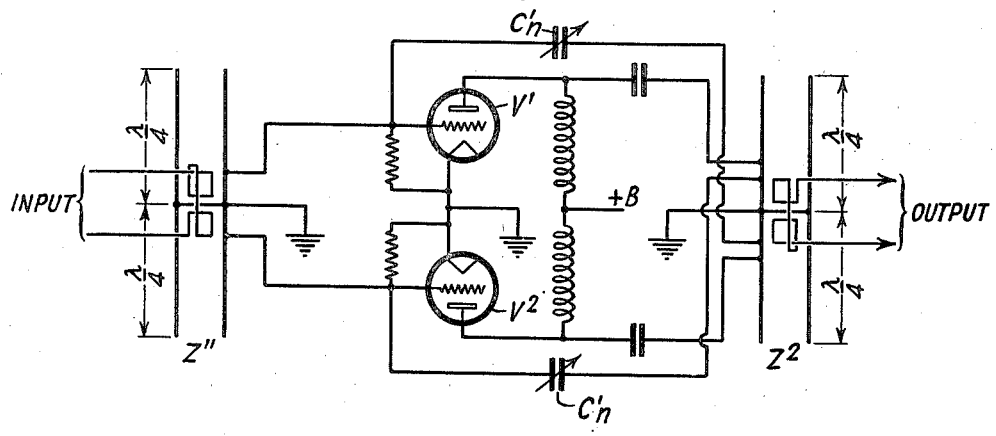

Patented June 24, 1941

2,247,218

UNITED STATES PATENT OFFICE 2,247,218

NEUTRALIZING CIRCUITS EMPLOYING RESONANT LINES

Arthur M. Braaten, Riverhead, N. Y., assignor to Radio Corporation of America, a corporation of Delaware Application April 28, 1938, Serial No. 204,766

11 Claims. (Cl. 179—171)

The present invention relates to improvements in neutralizing circuits for the neutralization of capacity coupling between the grid and anode circuits of a vacuum tube, which capacity coupling results in undesirable reaction of the anode circuit on the grid circuit.

The requirements for a vacuum tube amplifier circuit to be perfectly neutralized are: (1) That the voltage existing across the output circuit of the amplifier should produce no voltage across the input circuit of the amplifier, and (2) that any alternating current voltage existing between the anode and cathode should produce no voltage between the grid and cathode.

The known fundamental neutralizing circuits (Rice and Hazeltine) employed for fulfilling the above requirements use inductance coils and depend upon the auto-transformer action thereof. One difficulty with these known neutralizing circuits lies in the fact that perfect auto-transformer action of the coils is never achieved, due to the fact that the coils always have considerable magnetic leakage. This difficulty is more pronounced at the higher frequencies than at the lower frequencies. Another difficulty of the known types of neutralizing circuits is that it is practically impossible to design, for use in such circuits, a high voltage inductance coil which will possess small magnetic leakage at the high frequencies. Consequently, a perfect balance cannot be obtained in transmitter circuits employing such neutralizing circuits at the high frequencies.

For the purpose of exposition, the two known fundamental neutralizing circuits have been shown diagrammatically in Figs. 1a and 2a of the accompanying drawings, and their equivalent bridge circuits shown respectively in Figs. 1b and 2b.

Referring to Fig. 1a, there is shown, in schematic form, a known type of neutralization circuit employing the plate form of neutralization, wherein the inductance coil in the anode circuit is center-tapped. This circuit comprises a vacuum tube V having anode, grid, and cathode electrodes labeled respectively A, G and K. Across the grid G and cathode K there is shown a suitable parallel tuned input circuit comprising an inductance coil $L_1$, and in shunt thereto a condenser $C_1$, this circuit being tuned to a predetermined frequency. The output circuit of the vacuum tube V comprises an inductance coil $L_2$ shunted by a condenser $C_2$, the midpoint of the inductance coil $L_2$ being connected back to the cathode K through a battery B. One terminal of the tuned circuit comprising $L_2C_2$ is connected to the anode A while the other terminal N of the tuned circuit is connected back to the grid through a variable condenser $C_n$. In this way, the voltage fed back from the output circuit $L_2C_2$ over condenser $C_n$ to the grid is arranged to be equal and opposite to that impressed on the grid through the anode-grid inter-electrode capacity of the tube. The equivalent electrical circuit for Fig. 1a is shown in Fig. 1b, wherein like parts are represented by like reference numerals. The condenser $C_{G_A}$ of Fig. 1b represents the inter-electrode capacity between the grid and anode of the vacuum tube V. The resistance $R_a$ represents the anode resistance within the tube, and is in series between the anode and the cathode with the element $\mu e_g$, the symbol $\mu$ designating the amplification factor of the tube, while the symbol $e_g$ represents the voltage on the grid. It will thus be seen that the equivalent tube generator circuit comprising $R_a$ in series with $\mu e_g$ is between the anode and the cathode, and not across the output circuit terminals A and N. Consequently, grid voltage $e_g$ will be unaffected by the alternating current voltage existing across the anode and cathode at all frequencies only if the coil $L_2$ acts as a perfect auto-transformer with no magnetic leakage; that is, provided there is perfect coupling between the two halves of the output coil $L_2$; a condition which is difficult if not impossible to obtain.

Fig. 2a illustrates another known type of neutralization circuit, employing the grid form of neutralization, wherein the inductance coil in the grid circuit is center-tapped. The equivalent electrical circuit for this figure is shown in Fig. 2b. From an inspection of Fig. 2b, it will be noted that the equivalent tube generator $\mu e_g$, which is in series with the anode resistance $R_a$, acts between the anode A and the cathode K. Here again, unless the center-tapped inductance coil $L_1$ has no magnetic leakage and negligible resistance, the equivalent tube generator $\mu e_g$ in series with $R_a$, acting between anode and cathode, will produce a voltage between the grid and the cathode. Since it is extremely difficult, if not impossible, to obtain perfect auto-transformer action (i. e., no leakage) in the inductance coil, there exists the same difficulty in the use of this neutralizing circuit as exists in the neutralizing circuit of Fig. 1a.

Although I have only discussed the single tube type of vacuum tube circuit, it will be obvious that the push-pull type of neutralization circuit employing two vacuum tubes is also subject to the same difficulties mentioned above in connection with the single tube circuits. This is because the equivalent generator of each tube acting independently, or both together, can be effective to cause no voltage between grid and cathode only where perfect auto-transformer action of the inductance coil exists and the resistance thereof is negligible. Since the coils always have considerable magnetic leakage, and the balance is upset by the resistance of the circuits, it will be evident that the known types of neutralizing circuits can only be approximately balanced at the lower frequencies.

The present invention overcomes the foregoing difficulties by providing, among other things, a neutralizing circuit which employs a resonant line in place of the center-tapped inductance coils of the prior art. This resonant line is made to have uniformly distributed inductance and capacitance characteristics, and may be considered as being divided electrically into two halves to simulate the two halves of the center-tapped coils heretofore used. Because the two halves of the uniform resonant line have substantially perfect coupling between them, there is no magnetic leakage between the sections of the line, and any voltage existing across one section is reproduced across the other. Consequently, by means of the present invention, there is provided a neutralizing circuit wherein the inter-electrode capacity coupling between the grid and anode can be perfectly neutralized.

A better understanding of this invention may be had by referring to the following description, which is accompanied by drawings wherein similar parts are labeled by similar reference characters. In these drawings:

Fig. 3b is the equivalent electrical circuit of Fig. 3a; and

Figs. 4, 5 and 6 illustrate other embodiments of the present invention, also employing resonant lines.

Figure 1A:
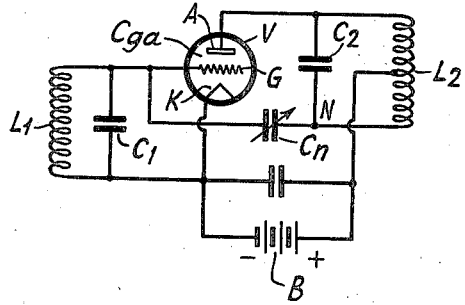
Fig. 1a and Fig. 2a illustrate two known fundamental types of neutralizing circuits.
Figure 1B:
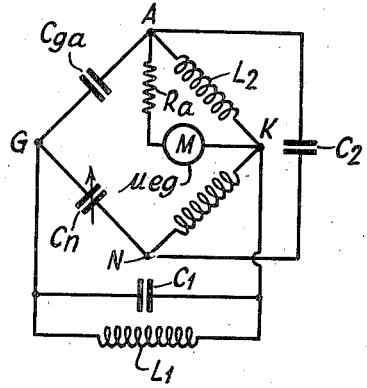
Figs. 1b and 2b illustrate the equivalent electrical circuits of Figs. 1a and 2a, respectively.
Figure 2A:
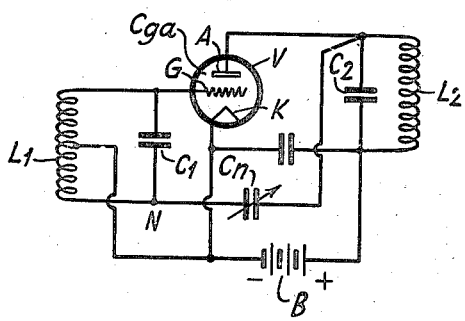
Figure 2B:
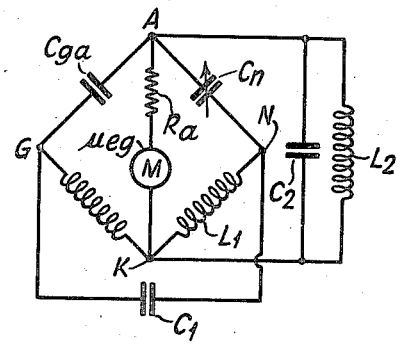
Figure 3A:
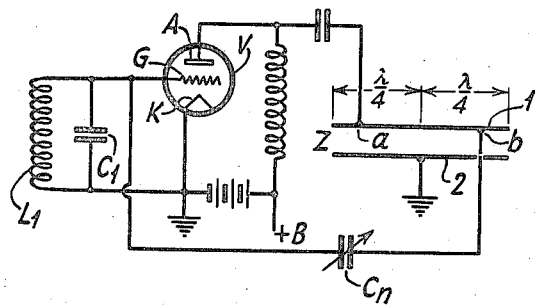
Fig. 3a illustrates, by way of example only, one embodiment of the present invention employing a resonant line for achieving perfect neutralization.
Figure 3B:
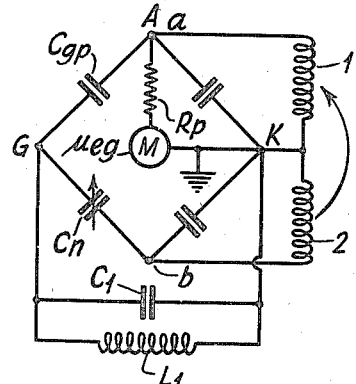

Referring to Fig. 3a, there is provided in the anode circuit of the vacuum tube V a resonant line Z of the Lecher wire type having two parallel conductors 1 and 2, each of which is one-half wavelength long. The center of one conductor 2 of the Lecher wire system is grounded to provide a return path to the cathode, while on opposite sides of the center and on the other conductor 1 of the Lecher wire system, connections extend from points $a$ and $b$ to both the anode A and the grid G of the tube V. Points $a$ and $b$ are preferably placed at equal distances on opposite sides of the center line, so as to be of opposite instantaneous polarity or phase. If desired, one of the points $a$ or $b$ can be at a different distance from the center than the other point, and the difference compensated for by variation of the neutralizing or feed-back condenser $C_n$, so that the voltage fed back from the condenser $C_n$ to the grid G is equal and opposite to the voltage produced on the grid due to the inter-electrode capacity between the anode and the grid. It will be obvious that the center of the line 1, 2 will be a voltage nodal point, and that any desired neutralization voltage can be obtained by tapping on to the line at point $b$ a certain distance from the nodal point, which in the preferred case is equal to the distance from the center to a point $a$ although on opposite sides from the center. Where a one-half wavelength long resonant line is employed, each half will be one-quarter wavelength long, thus providing in effect two resonant circuits grounded at their junction point. These two resonant circuits may be considered as having perfect coupling between them. In other words, there is no magnetic leakage between the two sections of line constituting the two resonant circuits and a voltage existing across one resonant circuit will be produced across the other. Consequently, any voltage produced between the anode A and the cathode K will produce no voltage between the grid G and the cathode K, and the system is thus perfectly neutralized.

Although the resonant line 1, 2 has here been shown as being one-half wavelength long at the operating frequency, it should be understood that the length of the line is not limited thereto, since, if desired, any line an integral odd multiple of one-half wavelength can also be used, providing the tapping points $a$ and $b$ are respectively chosen on opposite sides of a nodal point so as to obtain the desired opposite polarities.

Fig. 4 illustrates an arrangement similar to that of Fig. 3a, except that here the resonant line Z is in the input circuit of the vacuum tube amplifier V instead of in the output circuit. In Fig. 4 the neutralizing condenser $C_n$ is connected in series with the connection from the anode to the line. It should be observed that this arrangement of the neutralizing condenser differs from that of Fig. 3a wherein the neutralizing condenser is shown in the grid connection. Since the arrangement of the resonant line Z and its tapping points is substantially the same as that described in connection with Fig. 3a, it is not believed necessary to repeat the operation of the circuit.

Fig. 5 illustrates a preferred type of neutralization circuit employing a concentric or coaxial resonant line instead of the Lecher wire type of resonant line for achieving applicant's results.

In Fig. 5 there is shown a neutralized vacuum tube amplifier circuit similar to that of Fig. 3a, having a suitable input circuit, and an output circuit comprising the coaxial or concentric line Z', one-half wavelength long at the operating frequency, to the inner conductor 1' of which the connections from the anode A and grid G of the vacuum tube V extend. As described above in connection with Fig. 3a, the grid and anode connections are tapped at points $a$ and $b$ on opposite sides of the center of the resonant line. These connections, it should be noted, pass through insulating beads in the outer conductor of the resonant line. Both the outer and inner conductors of the concentric line are grounded at their center points to provide, in effect, two symmetrical resonant circuits on opposite sides of the center of the line. Points $a$ and $b$ have produced in them voltages of opposite instantaneous polarity existing on the two resonant circuits. A suitable circuit for obtaining output energy from the resonant line comprises a pair of loops 5 which are symmetrically disposed on opposite sides of the center of the line and coupled in opposite senses to the inner conductors of the two one-quarter wavelength resonant circuits. In effect, therefore, we have a push-pull output circuit, composed of these two coils 5, which is coupled to an unbalanced or single tube amplifier circuit. Since the operation of the neutralizing features of the circuit is the same as that described above in connection with the other figures, it is not deemed necessary to repeat the same again. Of course, the same remarks mentioned above in connection with the length of the Lecher wire system 1, 2 apply equally to the length of the concentric resonant line Z'. Although the system of Fig. 5 shows the concentric line in the output circuit, in order to simulate the circuit of Fig. 3a, it will be obvious that the resonant line can be applied to the input circuit so as to simulate the circuit of Fig. 4. In other words, the Lecher wire system of Fig. 4 can be replaced with a concentric transmission line, thus in effect providing a coupling circuit from a push-pull input to a single or unbalanced output circuit.

Fig. 6 illustrates a push-pull type of neutralization circuit employing resonant lines in both the input and output circuits. These resonant lines are here shown by way of illustration as being of the Lecher wire type, although it will be obvious that they may equally well be of the concentric or coaxial line type. The system comprises two vacuum tubes $V^1$ and $V^2$ whose grids are connected on opposite sides of the grounded center of the resonant line Z'', and whose anodes are similarly connected on opposite sides of the grounded center of the resonant line $Z^2$. Neutralizing condensers $C'_n$ connect the grids of the two tubes to points on the resonant line $Z^2$ which are symmetrically disposed on opposite sides of the center of the line in such manner that the anode of one tube is coupled on the same side of the center of the line as the connection to the grid of the other tube. The input signals are applied to the resonant line Z'' and output energy is obtained from the resonant line $Z^2$ by means of double loop circuits, which are symmetrically disposed on opposite sides of the center of the respective resonant lines, and coupled in opposite senses symmetrically to these respective lines. The operation of the push-pull neutralizing circuit of the invention is substantially similar to the known type of push-pull neutralization circuit, except for the present improvement of providing a resonant line for each of the tuned circuits. Consequently, from what has been said above in connection with the other figures, it is not deemed necessary to go into further detail concerning the operation of this circuit.

The term "odd-multiple of one-half wavelength" used in the appended claims, is to be deemed as including any odd multiple including one.

What is claimed is:

1. An electric circuit for neutralizing capacity coupling between the grid and anode circuits of a vacuum tube, one of said circuits comprising a concentric resonant line an odd multiple of a half wavelength long, and connections from the grid and anode of said tube to points of opposite phase on the inner conductor of said line which are oppositely disposed with respect to the center thereof, whereby the voltage impressed on said grid from one of the connections to said line is substantially equal and opposite to that impressed on said grid through the anode-grid capacity of the tube.

2. An electric circuit for neutralizing capacity coupling between the grid and anode circuits of a vacuum tube, said electric circuit having an input circuit comprising a Lecher wire resonant line an odd multiple of a half wavelength long, and connections from the grid and anode of said tube to points of opposite phase on one conductor of said line which are oppositely disposed with respect to the center thereof, said anode connection including a variable neutralizing condenser, whereby the voltage impressed on said grid from the anode by way of said neutralizing condenser and said connections to said line is substantially equal and opposite to that impressed on said grid through the anode-grid capacity of the tube.

3. An electric circuit for neutralizing capacity coupling between the grid and anode circuits of a vacuum tube, said electric circuit having an output circuit comprising a two-conductor resonant line and odd multiple of a half wavelength long, and connections from the grid and anode of said tube to points of opposite phase on one conductor of said line which are oppositely disposed with respect to the center thereof, whereby the voltage impressed on said grid from the grid connection to said line is substantially equal and opposite to that impressed on said grid through the anode-grid capacity of the tube.

4. An electric circuit for neutralizing capacity coupling between the grid and anode circuits of a vacuum tube, said anode circuit comprising a concentric resonant line an odd multiple of a half wavelength long, and connections from the grid and anode of said tube to points of opposite phase on the inner conductor of said line which are equally and oppositely disposed with respect to the center thereof, whereby the voltage impressed on said grid from the grid connection to said line is substantially equal and opposite to that impressed on said grid through the anode-grid capacity of the tube.

5. An electric circuit for neutralizing capacity coupling between the grid and anode circuits of a vacuum tube, said anode circuit comprising a two-conductor Lecher wire resonant line an odd multiple of a half wavelength long, and connections from the grid and anode of said tube to points of opposite phase on one conductor of said line which are oppositely disposed with respect to the center thereof, said grid connection to said line including in series therewith a neutralizing capacity, whereby the voltage impressed on said grid from the grid connection to said line is substantially equal and opposite to that impressed on said grid through the anode-grid capacity of the tube.

6. An electric circuit for neutralizing capacity coupling between the grid and anode circuits of a vacuum tube, said anode circuit comprising a Lecher wire resonant line an odd multiple of a half wavelength long, and connections from the grid and anode of said tube to points of opposite phase on one conductor of said line which are oppositely disposed with respect to the center thereof, the connection from said grid to said line including in series therewith a neutralizing capacity, a connection to ground from a voltage nodal point on said one conductor located between said first two points whereby the voltage impressed on said grid from the grid connection to said line is substantially equal and opposite to that impressed on said grid through the anode-grid capacity of the tube.

7. An electric circuit for neutralizing capacity coupling between the grid and anode circuits of a vacuum tube, said anode circuit comprising a Lecher wire resonant line a half wavelength long, connections from the mid-points of the wires of said line to ground and connections from the grid and anode of said tube to points of opposite phase on one wire of said line which are oppositely disposed with respect to the center thereof, the connection from said grid to said line including in series therewith a neutralizing capacity, whereby the voltage impressed on said grid from the grid connection to said line is substantially equal and opposite to that impressed on said grid through the anode-grid capacity of the tube.

8. A push-pull neutralizing circuit comprising a pair of vacuum tubes each having an anode, a cathode, and a grid, connections between corresponding electrodes of said tubes, each of said tubes having an output circuit and an input circuit both being in the form of resonant lines an odd multiple of half the wavelength at the operating frequency, a connection from the mid point of each of said resonant lines to ground and to said cathodes, said grids being connected to points of opposite polarities on opposite sides of the mid point of one conductor of said input resonant line, said anodes being similarly connected to points of opposite polarities on opposite sides of the mid point of one conductor of said output resonant line, and a capacity neutralizing connection from the grid of each tube to a point on said one conductor of said output resonant circuit on the same side of the center thereof as the connection to the anode of the other tube.

9. An electric circuit for neutralizing capacity coupling between the grid and anode circuits of a vacuum tube, one of said circuits comprising a two-conductor resonant line an odd multiple of a half wavelength long, and connections from the grid and anode of said tube to points on one conductor of said line which are of opposite polarity and which are oppositely disposed with respect to the center thereof, whereby the voltage impressed on said grid from one of the connections to said line is substantially equal and opposite to that impressed on said grid through the anode-grid capacity of the tube.

10. An electric circuit for neutralizing capacity coupling between the grid and anode circuits of a vacuum tube, said electric circuit having an input circuit comprising a two-conductor resonant line an odd multiple of a half wavelength long, and connections from the grid and anode of said tube to points on one conductor of said line which are of opposite polarity and which are oppositely disposed with respect to the center thereof, a connection from the center of said other conductor of said line to ground, whereby the voltage impressed on said grid from the anode by way of said neutralizing condenser and said connections to said line is substantially equal and opposite to that impressed on said grid through the anode-grid capacity of the tube.

11. An electric circuit for neutralizing capacity coupling between the grid and anode circuits of a vacuum tube, one of said circuits comprising a two-conductor resonant line an odd multiple of a half wavelength long, and connections from the grid and anode of said tube to points on one conductor of said line which are of opposite polarity and which are oppositely disposed with respect to the center thereof, one of said connections to said line including in series therewith a neutralizing capacity, whereby the voltage impressed on said grid from said one connection to said line is substantially equal and opposite to that impressed on said grid through the anode-grid capacity of the tube.

ARTHUR M. BRAATEN.